April 2, 1946. A. E. JENNINGS 2,397,863
TIRE SPREADER
Filed Oct. 30, 1944 4 Sheets-Sheet 1
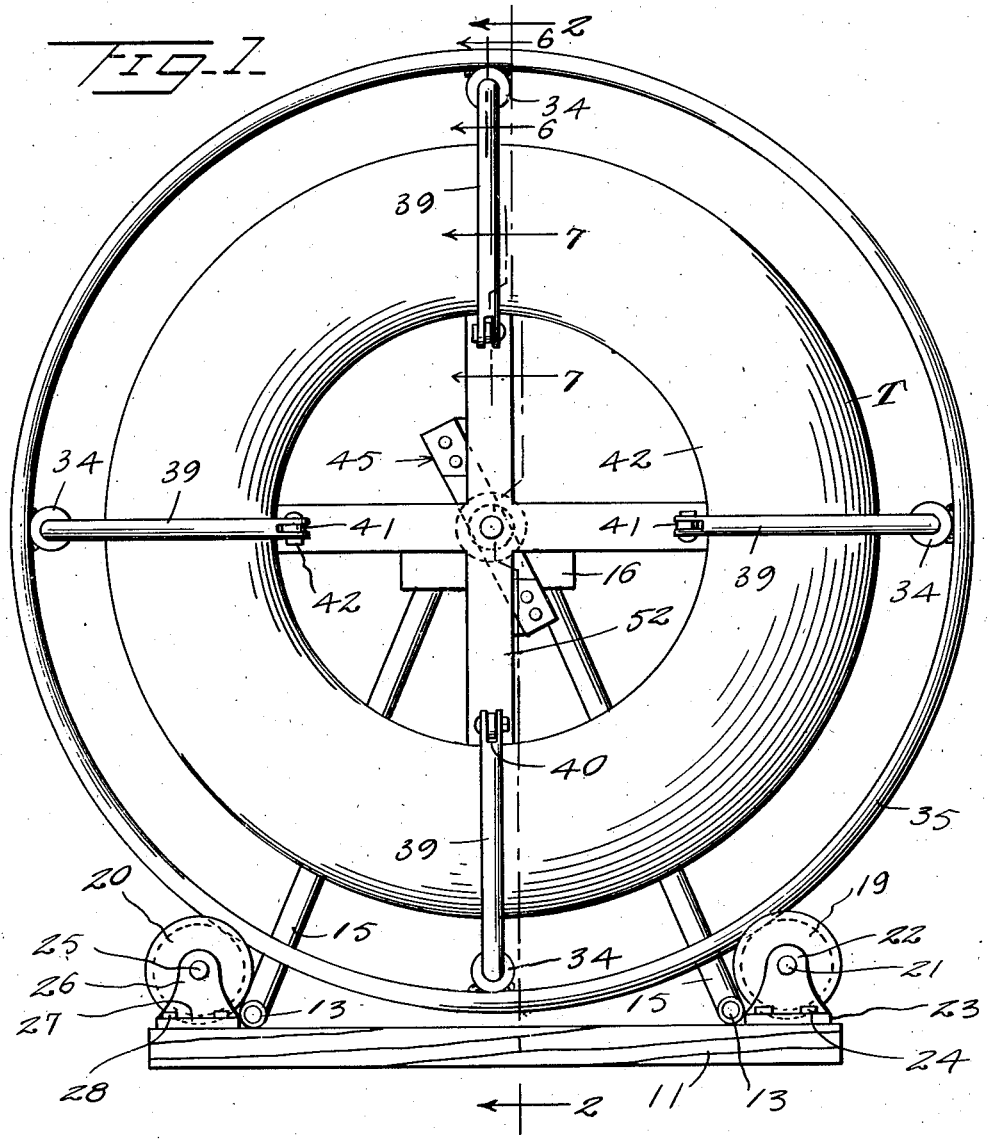
Fig. 1.
Fig. 7.
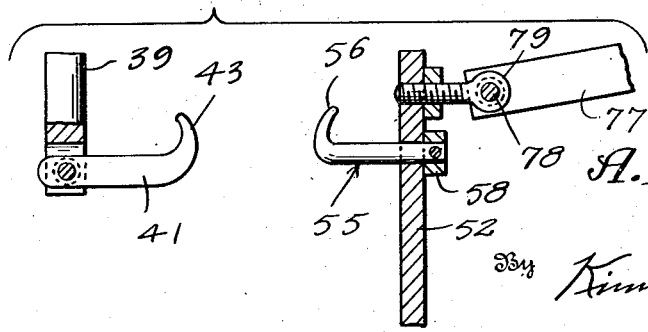
Inventor
A. E. Jennings
By Kimmel & Crowell
Attorneys April 2, 1946.　　　　A. E. JENNINGS　　　　2,397,863
TIRE SPREADER
Filed Oct. 30, 1944　　　　4 Sheets-Sheet 2

FIG. 2.

Inventor
A. E. Jennings

By Kimmel & Crowell
Attorneys

April 2, 1946.　　　A. E. JENNINGS　　　2,397,863
TIRE SPREADER
Filed Oct. 30, 1944　　　4 Sheets-Sheet 3
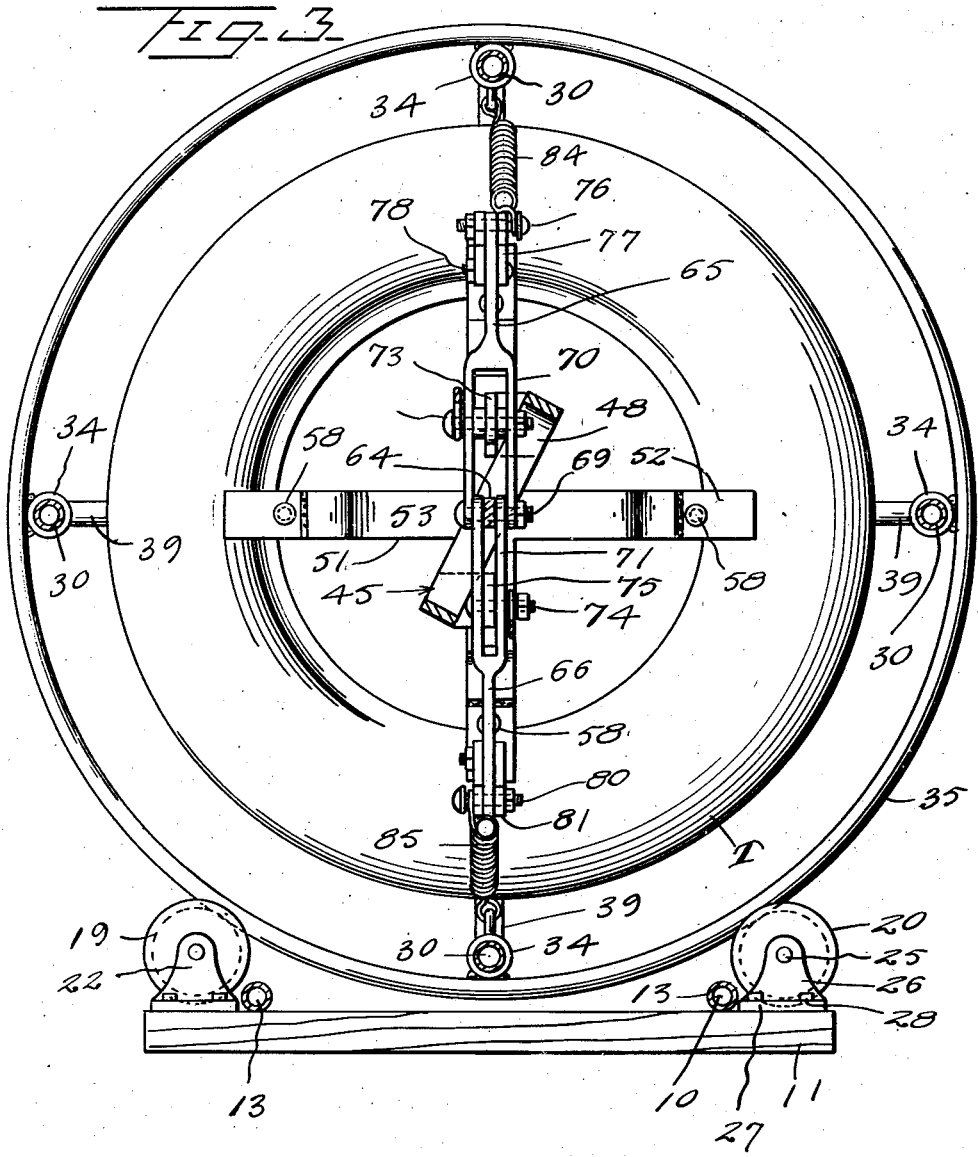
Inventor
A. E. Jennings
By Kimmel & Crowell
Attorneys April 2, 1946. A. E. JENNINGS 2,397,863
TIRE SPREADER
Filed Oct. 30, 1944 4 Sheets-Sheet 4
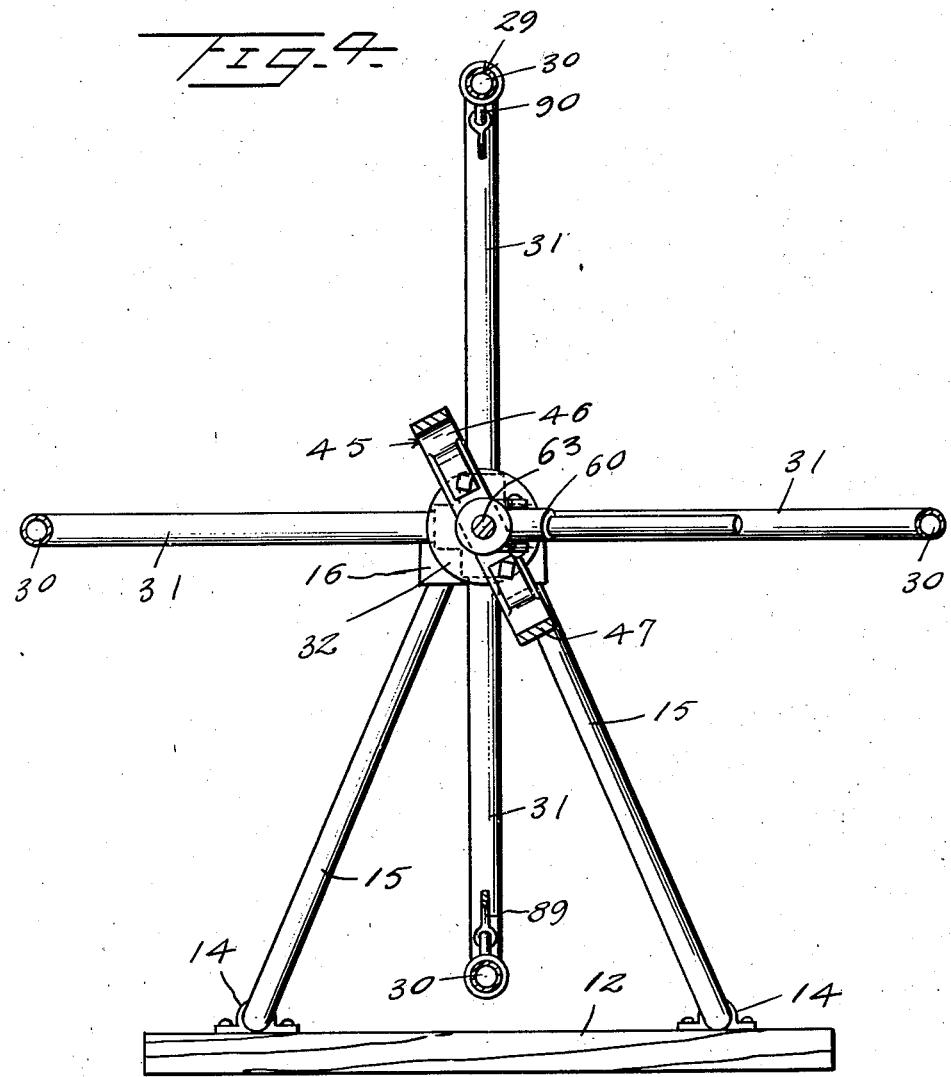
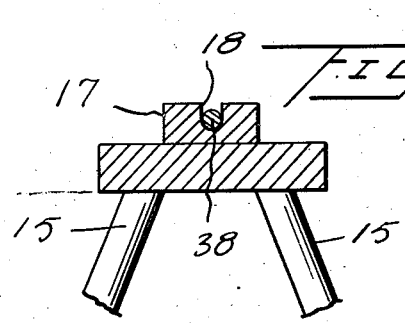
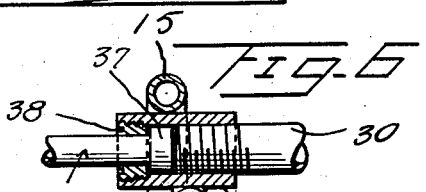

Patented Apr. 2, 1946

2,397,863

UNITED STATES PATENT OFFICE 2,397,863

TIRE SPREADER

Aaron E. Jennings, Central City, Ky.

Application October 30, 1944, Serial No. 561,047

5 Claims. (Cl. 154—9)

This invention relates to tire spreaders.

An object of this invention is to provide a hydraulically operated tire spreader for spreading a tire to permit inspection of the interior thereof, the spreader being so constructed that the tire may be rotated while in spread condition.

Another object of this invention is to provide a tire spreader of this kind which includes a stationary portable frame, and a removable tire spreading means which is rotatably supported by the frame.

A further object of this invention is to provide a tire spreader which includes a plurality of detachable hooks adapted to engage one bead of the tire, and additional hooks engageable with the other bead of the tire, one series of hooks being movable under hydraulic pressure away from the other series of hooks so as to thereby spread the beads apart a sufficient distance so that the interior of the tire may be inspected, repaired, or a new liner inserted therein.

To the foregoing objects, and others which may hereinafter more fully appear, the invention consists of the novel construction, combination and arrangement of parts, as will be more specifically referred to and illustrated in the accompanying drawings, but it is to be understood that changes, variations, and modifications may be resorted to which fall within the scope of the invention as claimed.

In the drawings:

Figure 1 is a detail front elevation of a tire spreader constructed according to an embodiment of this invention.

Figure 2 is a sectional view taken on the line 2—2 of Figure 1.

Figure 3 is a sectional view taken on the line 3—3 of Figure 2.

Figure 4 is a sectional view taken on the line 4—4 of Figure 2.

Figure 5 is a fragmentary sectional view taken on the line 5—5 of Figure 2.

Figure 6 is a fragmentary sectional view taken on the line 6—6 of Figure 1.

Figure 7 is a fragmentary sectional view taken on the line 7—7 of Figure 1.

Referring to the drawings, the numeral 10 designates generally a stationary frame which includes a pair of base members 11 and 12 which have secured thereto a pair of L-shaped supporting members having one side 13 thereof lowermost and horizontal with the lowermost sides of the two L-shaped members disposed between the two base members 11 and 12. The rear ends of the lower members 13 are secured by clips 14 to the rear base member 12. The L-shape members also include upwardly convergent sides 15, which are secured to a head or plate 16, forming a support for an upper rear bearing 17, having an upwardly opening bearing slot or recess 18.

The forward base member 11 has mounted thereon a pair of grooved rollers 19 and 20. Roller 19 is rotatably carried by a shaft 21 extending between a pair of upstanding ears 22 carried by one or more base plates 23 secured by fastening members 24 to the upper side of base 11. Roller 20 is rotatably carried by a shaft 25 disposed between a pair of upstanding ears 26, which are carried by one or more base plates 27 fixed by fastening members 28 to the upper side of base 11. The horizontal sides 13 of the L-shaped bearing supporting members are secured as by welding or the like to the base plates 23 and 27. A rotatable tire spreading structure is mounted on the rollers 19 and 20 and supported by the bearing 17. This tire spreading structure includes a rotatable frame formed of a plurality of L-shaped members 29. The L-shaped members 29 have one side 30 thereof horizontal and the other side 31 of each L-shaped member is radially arranged and is secured by welding or other suitable fastening means to a hub 32. The hub 32 has fixed thereto and extending rearwardly therefrom a shaft 33 which removably engages in the recess 18 for rotatably supporting the rear portion of the spreading frame.

The forward ends of the horizontal sides 30 of the L-shaped members 29 have secured thereto coupling members or sleeves 34, and a ring or wheel 35 is secured as by welding or the like to the outer sides of the coupling members or sleeves 34. The wheel or ring 35 is adapted to engage in the grooves of the two rollers 19 and 20. Each horizontal side 30 has swivelly mounted therein an L-shaped bracket arm 36. The bracket arm 36 is formed at its inner end with a collar or flange 37 rotatably engaging in the sleeve 34 and a threaded nut 38 is threaded into the sleeve 34 for holding the bracket arm 36 within the sleeve 34 while permitting rotation thereof. The extended arm 39 of the bracket arm 36 is bifurcated, as indicated at 40, and a hook 41 engages between the bifurcations and is pivotally mounted on a pivot member 42. The hooks 41 are outermost and when in operative position are adapted to have the bills 43 thereof engage on the inside of one bead 44 of a tire T. The bracket arms 36 are swivelly mounted in the sleeves 34 so that during the mounting of the tire T on the spreader structure, these bracket arms may be swung outwardly so that the tire may be readily engaged with the movable portion of the spreader structure.

A U-shaped member 45 has the bight 46 thereof secured as by welding or the like to the hub 32 and the parallel arms 47 extend forwardly within the horizontal sides 30 of the L-shaped members 29. The outer ends of the arms 47 have secured to or formed integrally therewith a connecting bar 48, which is formed with a boss 49 constituting a base for a guide shaft 50 extending in the direction of the tire T. A slide member generally designated as 51 is slidable on the shaft 50 and comprises a plurality of radially arranged arms 52, which have secured to the rear sides thereof rearwardly offset radially arranged bracing arms 53.

A sleeve or bearing 54 is secured between the central portions of the arms 52 and 53 and slidably engages on stationary shaft 50. The arms 52 have rotatably mounted in the outer portions thereof hook members 55. The hook members 55 are formed with a bill 56 adapted to engage the second or other bead 57 of the tire. The hooks 55 are formed with heads 58 bearing against the rear sides of arms 52, so that when the slide 51 is moved rearwardly, bead 57 will be pulled rearwardly therewith.

In order to provide for the desired movement of slide 51 to spread the tire, I have provided a hydraulic operator 59 which is clamped or otherwise secured to the bight 46 of the U-shaped member 45. The operator 59 includes a pump handle 60 and also includes a pressure releasing screw 61, releasing pressure from the cylinder 62 thereof. A piston 63 extends from the cylinder 62 and has secured thereto a forwardly extending ear 64. A pair of rock levers 65 and 66 which are formed at their inner ends with elongated slots 67 and 68 rockably engage a pivot member 69 carried by the ear 64. Rock lever 65 is bifurcated at its inner end, as indicated at 70, and rock lever 66 is bifurcated at its inner end, as indicated at 71. Rock lever 65 is rockably mounted on a pivot 72 carried by an ear 73 which is welded or otherwise fixed to the connecting bar 48. Rock lever 66 is rockably mounted on a pivot 74 engaging through an ear 75 carried by connecting member 48. The outer end of lever 65 is pivotally connected, as at 76, to a link 77. The link 77 is rockably mounted on a pivot 78, engaging an eye bolt 79 fixed to the outer end of one of the radial arms 52. Rock lever 66 is pivotally connected, as at 80, to a link 81 which is positioned diametrically opposite link 77. Link 81 is rockably mounted on a pivot 82, engaging through an eye bolt 83.

In order to provide for the automatic return of the levers 65 and the slide 51 to a forward release position, I have provided a pair of springs 84 and 85. Spring 84 engages pivot members 76 at one end thereof and at the opposite end engages an eye 86 fixed to one of the sleeves 34. Spring 85 engages pivot member 80 and also engages an eye 87 which is fixed to a diametrically opposite sleeve or coupling 34. The frame structure formed by the U-shaped member 45 is braced by means of a pair of bracing rods 88 and 89, which are secured at their outer ends to eyes 90 and 91, and are then extended convergently inward and are secured at their inner ends to pivot members 72 and 74. A turn-buckle 92 is interposed in bracing member 88 and a turn-buckle 93 is interposed in bracing member 89.

In the use and operation of this tire spreader, the tire T is supported by the hooks 41 and 55, initially being engaged with hooks 55 which are hooked over the bead 57. Arms 36 which are initially swung outwardly to permit fastening of the tire on hooks 55 carried by slide 51 are swung inwardly so that the outer sides 39 of arms 36 are radially disposed. Hooks 41 are then engaged with the bead 44 of the tire. At this time slide 51 is at its foremost position, which is the position shown in Figure 2.

Handle 60 may then be rocked so as to move plunger 63 of hydraulic member 59 outwardly, and as piston 63 moves outwardly, levers 65 and 66 will be rocked rearwardly at their outer ends, thereby pulling slide 51 rearwardly against the tension of springs 84 and 85. As slide 51 moves rearwardly, bead 57 will be pulled away from bead 44, thereby opening the interior of the tire to permit inspection, repair or insertion of a liner or other desired elements. When the desired or necessary operation has been performed on the tire, release 61 may be operated to permit rearward movement of piston 63 under the tension of springs 84 and 85. Springs 84 and 85 will move slide 51 forwardly until tire T assumes substantially it normal position. When the tire is spread the rotatable frame structure embodying the L-shaped members 29 and the ring 35 may be rotated with respect to the stationary frame 10, so that all portions of the interior of the tire may be inspected or worked upon.

What I claim is:

1. A tire spreader comprising a base structure, a pair of rollers carried by said base structure, an upwardly offset bearing carried by said base structure, a skeleton spreader frame rotatably carried by said base structure and including a plurality of parallel bars, a ring carried by said bars at one end thereof and engaging said rollers, radial arms carried by the opposite ends of said bars, a hub fixed to said radial arms, a shaft fixed to said hub and engaging said bearing, a U-shaped guide support extending from said hub, a connecting bar between the ends of the legs of said support, a guide shaft carried by said connecting bar, a slide on said guide shaft formed of a plurality of radial bars, complementary hooks carried by said first bars and said radial bars for engagement with the beads of a tire, and means disposed between the parallel legs of said U-shaped support operatively connected to said slide whereby said slide may be moved rearwardly to tire spreading position.

2. A tire spreader as set forth in claim 1 including a pair of rock levers rockably carried by said guide support, and links connecting the outer ends of said levers with said slide whereby rocking of said levers will shift said slide.

3. A tire spreader comprising a base structure, a pair of grooved rollers rotatably carried by said base structure, a bearing carried in upwardly offset relation with respect to said base structure, a skeleton frame rotatable relative to said base structure, a ring carried by said frame engaging said rollers, a shaft carried by said frame engaging said bearing, and means carried by said frame engageable with the beads of a tire for spreading said beads apart, said means including L-shaped hook carriers rockably carried by said frame, hooks pivotally carried by said carriers engageable with one bead of the tire, a movable hook carrier within said frame, hooks carried by said movable carrier engageable with the other bead of the tire, and means for moving said movable carrier relative to said L-shaped carriers.

4. A tire spreader comprising a base structure, a pair of grooved rollers rotatably carried by said base structure, an upwardly offset bearing carried by said base structure, and a tire spreading frame rotatably engaging said rollers and said bearing, said frame including an axially disposed guide shaft, a slide carried by said shaft, means for shifting said slide along said guide shaft, and means carried by said slide and said frame engageable with the beads of the tire for moving one bead relative to the other bead, said means for shifting said slide including a pair of levers rockably carried by said frame.

5. A tire spreader comprising a base structure, a pair of grooved rollers rotatably carried by said base structure, an upwardly offset bearing carried by said base structure, and a tire spreading frame rotatably engaging said rollers and said bearing, said frame including an axially disposed guide shaft, a slide carried by said shaft, means for shifting said slide along said guide shaft, and means carried by said slide and said frame engageable with the beads of the tire for moving one bead relative to the other bead, said means for shifting said slide including a pair of levers rockably carried by said frame, and a hydraulic operator for said levers.

AARON E. JENNINGS.